US012512279B2

(12) United States Patent
Tannhäuser et al.

(10) Patent No.: US 12,512,279 B2
(45) Date of Patent: Dec. 30, 2025

(54) CIRCUIT BREAKER

(71) Applicant: Siemens Aktiengesellschaft, Munich (DE)

(72) Inventors: Marvin Tannhäuser, Hausen (DE); Manfred Heindl, Alteglofsheim (DE); Jörg Hussmann, Neumarkt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/696,511

(22) PCT Filed: Sep. 9, 2022

(86) PCT No.: PCT/EP2022/075083
§ 371 (c)(1),
(2) Date: Mar. 28, 2024

(87) PCT Pub. No.: WO2023/052081
PCT Pub. Date: Apr. 6, 2023

(65) Prior Publication Data
US 2024/0387120 A1    Nov. 21, 2024

(30) Foreign Application Priority Data
Sep. 28, 2021   (DE) ...................... 10 2021 210 815.6

(51) Int. Cl.
*G01R 31/327*   (2006.01)
*H01H 3/00*   (2006.01)
(Continued)

(52) U.S. Cl.
CPC ......... *H01H 9/548* (2013.01); *G01R 31/3275* (2013.01); *H01H 3/001* (2013.01);
(Continued)

(58) Field of Classification Search
CPC .... G01R 31/3275; H01H 9/547; H01H 9/548; H01H 71/04; H01H 71/52;
(Continued)

(56) References Cited

U.S. PATENT DOCUMENTS 6,665,591 B1 * 12/2003 Griepentrog ............. H02H 3/08
700/286
11,538,642 B2   12/2022 Hussmann
(Continued)

FOREIGN PATENT DOCUMENTS

DE          3926644 A1   2/1991
DE       102018209114 B3   3/2019
(Continued)

*Primary Examiner* — Levi Gannon
(74) *Attorney, Agent, or Firm* — Laurence A. Greenberg; Werner H. Stemer; Ralph E. Locher (57) ABSTRACT

A circuit breaker protects an electric low-voltage circuit, having: a housing with grid-side connections and load-side connections for the low-voltage circuit; and a mechanical separating contact unit connected to an electronic interruption unit in series. The mechanical separating contact unit is paired with the load-side connections, and the electronic interruption unit is paired with the grid-side connections. The mechanical separating contact unit is switched by opening contacts to prevent a current flow or by closing the contacts for a current flow in the low-voltage circuit. Semiconductor-based switch elements of the electronic interruption unit are switched to a high-ohmic state to prevent a current flow or to a low-ohmic state for a current flow in the low-voltage circuit. A current sensor ascertains the level of the current of the low-voltage circuit and a controller is connected to the current sensor, the mechanical separating contact unit, and the electronic interruption unit.

20 Claims, 2 Drawing Sheets

(51) Int. Cl.
*H01H 9/54* (2006.01)
*H01H 71/04* (2006.01)
*H01H 71/52* (2006.01)
*H01H 83/20* (2006.01)
*H02H 3/04* (2006.01)
*H02H 3/08* (2006.01)

(52) U.S. Cl.
CPC ............ *H01H 9/547* (2013.01); *H01H 71/52* (2013.01); *H01H 83/20* (2013.01); *H02H 3/044* (2013.01); *H02H 3/08* (2013.01); *H01H 71/04* (2013.01); *H01H 2071/044* (2013.01)

(58) Field of Classification Search
CPC .. H01H 2071/124; H01H 83/20; H01H 83/22; H02H 3/044; H02H 3/08; H02H 3/335
See application file for complete search history.

(56) References Cited

U.S. PATENT DOCUMENTS

| | | | |
|---|---|---|---|
| 2010/0277846 A1* | 11/2010 | Koshin | H01H 9/548 |
| | | | 361/101 |
| 2016/0057841 A1* | 2/2016 | Lenig | H05B 45/10 |
| | | | 315/291 |
| 2020/0366078 A1* | 11/2020 | Telefus | H02H 3/044 |
| 2021/0142970 A1* | 5/2021 | Wölk | H01H 47/001 |
| 2021/0226437 A1* | 7/2021 | Lichauer | H02H 3/025 |
| 2022/0337046 A1 | 10/2022 | Erven | |
| 2025/0018797 A1* | 1/2025 | Tsuchiya | B60L 3/0046 |

FOREIGN PATENT DOCUMENTS

| | | |
|---|---|---|
| DE | 102018213354 A1 | 2/2020 |
| DE | 102019213604 A1 | 3/2021 |

* cited by examiner

CIRCUIT BREAKER

FIELD AND BACKGROUND OF THE INVENTION

The invention relates to the technical field of a circuit breaker device for a low-voltage circuit having an electronic interruption unit.

Low voltage is used to mean voltages of up to 1000 volts AC or up to 1500 volts DC. Low voltage is used to mean, in particular, voltages which are greater than the extra-low voltage, with values of 50 volts AC or 120 volts DC.

A low-voltage circuit or network or system is used to mean circuits having nominal currents or rated currents of up to 125 amperes, more specifically up to 63 amperes. A low-voltage circuit is used to mean, in particular, circuits having nominal currents or rated currents of up to 50 amperes, amperes, 32 amperes, 25 amperes, 16 amperes or 10 amperes. The current values mentioned are used to mean, in particular, nominal, rated or/and switch-off currents, that is to say the current which is normally conducted at most via the circuit, or for which the electrical circuit is usually interrupted, for example by a protection device such as a circuit breaker device, a miniature circuit breaker or a power circuit breaker. The nominal currents can be scaled further from 0.5 A, via 1 A, 2 A, 3 A, 4 A, 5 A, 6 A, 7 A, 8 A, 9 A, 10 A, etc., to 16 A.

Miniature circuit breakers are overcurrent protection devices which have been known for a long time and are used in electrical installation technology in low-voltage circuits. They protect lines from damage caused by heating on account of an excessively high current and/or a short circuit. A miniature circuit breaker can automatically switch off the circuit in the event of an overload and/or a short circuit. A miniature circuit breaker is a fuse element which does not automatically reset.

In contrast to miniature circuit breakers, power circuit breakers are provided for currents of greater than 125 A, sometimes also even above 63 amperes. Miniature circuit breakers therefore have a simpler and more delicate design. Miniature circuit breakers usually have a fastening possibility for fastening on a so-called top-hat rail (mounting rail, DIN rail, TH35).

Miniature circuit breakers have an electromechanical design. In a housing, they have a mechanical switching contact or shunt opening release for interrupting (tripping) the electrical current. A bimetallic protection element or bimetallic element usually is used for tripping (interruption) in the case of a longer-lasting overcurrent (overcurrent protection) or in the event of a thermal overload (overload protection). An electromagnetic release with a coil is used for brief tripping if an overcurrent limit value is exceeded or in the event of a short circuit (short-circuit protection). One or more arc quenching chamber(s) or arc quenching devices are provided. Connection elements for conductors of the electrical circuit to be protected are also provided.

Circuit breaker devices having an electronic interruption unit are relatively new developments. They have a semiconductor-based electronic interruption unit. That is to say, the electrical current flow in the low-voltage circuit is conducted via semiconductor components or semiconductor switches which can interrupt the electrical current flow or can be switched to be conductive. Circuit breaker devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current of the low-voltage circuit to be protected is conducted both via the mechanical isolating contact system and via the electronic interruption unit.

SUMMARY OF THE INVENTION

The object of the present invention is to improve a circuit breaker device of the type mentioned at the outset, in particular to specify a new, simple and improved architecture for such a circuit breaker device or to provide improved components for said circuit breaker device.

This object is achieved by means of a circuit breaker device having the features of the independent circuit breaker patent claim.

The invention proposes a circuit breaker device for protecting an electrical low-voltage circuit, in particular a low-voltage AC circuit, having:
- a housing with network-side connections and load-side connections for the low-voltage circuit,
- a mechanical isolating contact unit which is connected in series with an electronic interruption unit, wherein the mechanical isolating contact unit is assigned to the load-side connections and the electronic interruption unit is assigned to the network-side connections,
- wherein the mechanical isolating contact unit can be switched by means of opening of at least one contact (or contacts) in order to avoid a current flow or closing of at least one contact (or the contacts) for a current flow in the low-voltage circuit,
- wherein the electronic interruption unit can be switched, by means of semiconductor-based switching elements, to a high-impedance state of the switching elements in order to avoid a current flow or a low-impedance state of the switching elements for the current flow in the low-voltage circuit,
- a current sensor unit for determining the level of the current of the low-voltage circuit,
- a control unit which is connected to the current sensor unit, the mechanical isolating contact unit and the electronic interruption unit, wherein avoidance of a current flow in the low-voltage circuit is initiated if current limit values or/and current-time limit values are exceeded,
- wherein the mechanical isolating contact unit has a position sensor for determining position information relating to the closed or open state of the contacts.

The invention proposes a circuit breaker device, wherein the electronic interruption unit is assigned to the network-side connections, that is to say is normally constantly supplied with energy/is connected to the voltage, and the mechanical isolating contact unit is assigned to the load-side connections, that is to say interrupts the current flow only to a load, wherein the circuit breaker device (in particular the control unit or the electronic interruption unit) is still supplied with energy.

In this case, the position or situation of the at least one contact (or of the contacts) is determined according to the invention, that is to say position information relating to the closed or open state of the contacts is determined.

The position information is preferably determined only for the circuit breaker device, that is to say is processed (in particular only) inside the circuit breaker device. For this purpose, the position sensor is connected to the control unit, with the result that the control unit has position information relating to the closed or open state of the contacts.

In one configuration, the position information is not available, in particular, outside the circuit breaker device.

This has the advantage that information relating to the switching position of the contacts is available in a novel circuit breaker device and can be used for further functions, in particular a functional check of the circuit breaker device. The novel concept for a circuit breaker device provides for the circuit breaker device to be immediately ready to use and to be able to undertake communication functions and other functions even after a load has been disconnected.

Advantageous configurations of the invention are specified in the subclaims and in the exemplary embodiment.

In one advantageous configuration of the invention, the circuit breaker device is configured in such a manner that the position information is used to carry out functional checks of the circuit breaker device. In particular, checking functions are carried out on the basis of the position information.

This has the particular advantage that various checking functions can be carried out depending on the switching state (open/closed). In particular, checking functions of different lengths can be carried out. Longer checking functions can therefore be carried out when the contacts are open, that is to say when a consumer is not yet supplied with energy. When the contacts are closed, short checking functions can preferably be carried out in order to avoid supplying the consumer with too much energy and in order to avoid malfunctions. Checking functions of the circuit breaker device itself and of connected consumers can therefore be advantageously carried out in order to achieve increased safety of the novel circuit breaker device and of the low-voltage circuit.

In one advantageous configuration of the invention, the circuit breaker device is configured in such a manner that, for the functional check of the circuit breaker device when the contacts of the mechanical isolating contact unit are open and the electronic interruption unit has been switched to high impedance, the level of the voltage across the electronic interruption unit is determined (in particular using the first voltage sensor unit). There is a first fault condition if a first voltage threshold value is undershot, with the result that the electronic interruption unit is prevented from coming to have a low impedance or/and closing 8 of the contacts is prevented.

This is used to check the electronic interruption unit with regard to its "ability to be switched off", that is to say the semiconductor-based switching elements coming to have a high impedance.

The first voltage threshold value is advantageously, for example, 5-15% of the nominal voltage of the low-voltage circuit, for example 10%.

This has the particular advantage that it is easy to check the switch-off behavior or the switched-off state of the electronic interruption unit.

In one advantageous configuration of the invention, the circuit breaker device is configured in such a manner that, for the functional check of the circuit breaker device when the contacts of the mechanical isolating contact unit are open and the electronic interruption unit has been switched to high impedance, the electronic interruption unit is switched to a low-impedance state for a first period of time. In this case, the level of the voltage across the electronic interruption unit is determined. There is a second fault condition if a second voltage threshold value is exceeded, with the result that the electronic interruption unit is prevented from further coming to have a low impedance or/and closing of the contacts is prevented.

The first period of time may be in the range of a few µs, for example 100 µs, to the seconds range. It is limited, in principle, only by the manual switching-on of the mechanical isolating contact unit. It may be, for example, in the range of 100 µs to 2 ms, for example 100 µs, 200 µs, . . . 1 ms, 2 ms. In the case of switching times in the range of 1 ms to 2 ms, a voltage change can be detected. The period of time May also be longer, for example up to 1 second. It is then possible to check whether, for instance, a voltage of 0 V (instantaneous value or then also root-mean-square value of the voltage) is present across the electronic interruption 11 unit (for a "longer period of time"). Since the contacts of the mechanical isolating contact unit are open, the period of time is limited only by the time until the contacts are closed. That is to say, longer or long test times to well over one second are also possible. The position sensor can advantageously determine how long the contacts are open and thus the first period of time is adjusted.

The second voltage threshold value should be less than 1 V.

This has the particular advantage that the electronic interruption unit can be checked with regard to its "ability to be switched on" or the switched-on state.

In one advantageous configuration of the invention, closing of the contacts of the mechanical isolating contact unit is prevented when there is a fault condition. In particular, no enable signal (enable) is emitted to the mechanical isolating contact unit.

This has the particular advantage that only a functional circuit breaker device with a functional electronic interruption unit can be switched on. This increases operational safety in the low-voltage circuit. It is therefore ensured that the ability of the electronic interruption unit to be switched on and off functions.

In one advantageous configuration of the invention, the circuit breaker device is configured in such a manner that, for the functional check when the contacts of the mechanical isolating contact unit are closed and the electronic interruption unit has been switched to high impedance, the electronic interruption unit is switched to a low-impedance state for a second period of time. In this case (in the low-impedance state), the level of the voltage across the electronic interruption unit is determined. If a third voltage threshold value is exceeded, there is a third fault condition which prevents the electronic interruption unit from being switched to low impedance or/and initiates opening of the contacts.

The third voltage threshold value should be less than 1 V.

The second period of time may be short. For example, the second period of time may be less than 2 ms or 1 ms, in particular 500 us or 100 µs, for example.

This has the particular advantage that it is possible to check the ability of the electronic interruption unit to be switched on even in this operating state.

In one advantageous configuration of the invention, the electronic interruption unit is switched to a low-impedance state when the instantaneous value of the voltage between the network-side neutral conductor connection and the network-side phase conductor connection undershoots a fourth voltage threshold value.

The fourth voltage threshold value may be a value of the (protective) extra-low voltage. For example, the fourth voltage threshold value may be 50 V.

This has the particular advantage that the ability of the electronic interruption unit to be switched on is checked using a voltage or at times at which the voltage level is safe. This achieves high operational safety when simultaneously checking the circuit breaker device.

In one advantageous configuration of the invention, the circuit breaker device is configured in such a manner that, for the functional check when the contacts of the mechanical isolating contact unit are closed and the electronic interruption unit has been switched to low impedance, the level of the voltage across the electronic interruption unit is determined. If the fifth voltage threshold value is exceeded, there is a fourth fault condition which initiates the electronic interruption unit coming to have a high impedance or/and initiates opening of the contacts.

The fifth voltage threshold value should be less than 1 V.

This has the particular advantage that the electronic interruption unit is checked during ongoing operation and avoidance of a current flow in the low-voltage circuit is initiated if the electronic interruption unit is faulty, with the result that there is a safe state.

In one advantageous configuration of the invention, the circuit breaker device is configured in such a manner that, for the functional check when the contacts of the mechanical isolating contact unit are closed and the electronic interruption unit has been switched to low impedance, the electronic interruption unit is switched to a high-impedance state for a third period of time. The level of the voltage across the electronic interruption unit is determined in the high-impedance state. If a sixth voltage threshold value is undershot, there is a fifth fault condition which initiates the electronic interruption unit coming to have a high impedance or/and initiates opening of the contacts.

The third period of time should preferably be very short. For example, the third period of time may be less than 2 ms or 1 ms, more specifically less than 500 µs or 100 µs.

As a result, the loads or consumers are advantageously not disconnected from the network for long.

The sixth voltage threshold value may be dimensioned like the first voltage threshold value. The sixth voltage threshold value may be, for example, 5-15% of the nominal voltage or preferably of the applied voltage of the low-voltage circuit, for example 10%.

The sixth voltage threshold value may be dimensioned on the basis of the impedance or the resistance of the load or the load current, in particular the current that has previously flowed.

This has the particular advantage that the switch-off behavior or the ability of the electronic interruption unit 13 to be switched off or the switched-off state of the electronic interruption unit is checked easily during ongoing operation.

Furthermore, in the case of an energy absorber or overvoltage protection means within the electronic interruption unit, its functionality can also be advantageously checked. If current has previously flowed in the low-voltage circuit, the freewheeling current through or the resulting voltage across the energy absorber can be checked after the interruption unit has come to have a high impedance. If the electronic interruption unit is opened when there is a current flow, the voltage (on account of the inductance in the line circuit) increases to the voltage of the overvoltage protection means. The functionality of the energy absorber can therefore be checked.

The electronic interruption unit can advantageously come to have a high impedance at the zero crossing of the current. This has the particular advantage that there is no chopping of the current. Furthermore, since the load is not supplied with any current at this moment, the measurement has less effect on the load. Furthermore, a commutation process (decrease in the current in the inductive circuit) does not take place and the electronic interruption unit (including the energy absorber) can turn off immediately.

In one advantageous configuration of the invention, the electronic interruption unit is switched to a high-impedance state when the instantaneous value of the voltage between the network-side neutral conductor connection and the network-side phase conductor connection exceeds a seventh voltage threshold value, in particular when the instantaneous value of the voltage is at a maximum.

This has the particular advantage that the supply of energy is briefly interrupted at a maximum of the available energy, with the result that the effects are low. Furthermore, the electronic interruption unit is checked under maximum voltage, with the result that a malfunction can be identified in good time.

The seventh voltage threshold value may be, for example, greater than 160 V, 200 V, 240 V or 300 V (any intermediate value is likewise possible). The instantaneous value of the voltage at a maximum is 325 volts (in the case of a 230 volt network).

The above-mentioned functional checks are examples and it is also possible to use other functional checks in which the information from the position sensor is advantageously evaluated or used.

In one advantageous configuration of the invention, a power supply unit is provided and is or can be connected to the network-side connections. The power supply unit is connected to the control unit in order to provide an energy supply.

This has the particular advantage that the circuit breaker device is normally constantly supplied with energy, thus enabling operation that is normally constant.

In one advantageous configuration of the invention, the link between the power supply unit and the network-side connections has a fuse or/and a switch.

This has the particular advantage that the power supply unit or the control unit can be switched off, for example for insulation measurements. Furthermore, the power supply unit 6 or the control unit can be protected in order to achieve increased safety of the circuit breaker device against further faults.

In one advantageous configuration of the invention, the network-side connections comprise a network-side neutral conductor connection and a network-side phase conductor connection. The load-side connections comprise a load-side neutral conductor connection and a load-side phase conductor connection.

This has the particular advantage that there is a two-pole implementation.

In one advantageous configuration of the invention, the load-side neutral conductor connection and the load-side phase conductor connection are connected to the mechanical isolating contact unit. In one advantageous configuration of the invention, the electronic interruption unit is connected to the network-side phase conductor connection.

This has the particular advantage that there is a circuit breaker device with mechanical two-pole interruption and electronic single-pole interruption, wherein the electronic interruption unit is advantageously arranged in the current path of the phase conductor or phase conductor (current) path. This reduces the complexity and provides a circuit breaker device that provides safe interruption, is state of the art technology and nevertheless has a simple architecture.

In one advantageous configuration of the invention, the mechanical isolating contact unit has a handle for manually opening and closing the contacts.

This has the particular advantage that there is a circuit breaker device in accordance with conventional miniature circuit breakers.

In one advantageous configuration of the invention, the mechanical isolating contact unit is configured in such a manner that the position information relating to the closed or open state of the contacts can differ from the situation of the handle.

This has the particular advantage that a so-called trip-free mechanism can be used, for example, wherein the switching state of the contacts (open/closed) can be determined and monitored. A trip-free mechanism is specifically characterized in that it is not possible to close the contacts in response to a fault that already exists, or the contacts open again after the handle has been closed in response to a fault (as a result of which the situation of the handle differs from the situation of the contacts). A blocked handle does not block the contacts, with the result that the contacts can be opened at any time by the control unit.

In one advantageous configuration of the invention, the handle has an actuation sensor which is connected to the control unit, for determining actuation information relating to the handle.

This has the particular advantage that the checking functions can be accordingly adapted or ended by determining the actuation information relating to the handle, since closing of the contacts (or opening) can be expected, for example. Furthermore, it is therefore possible to advantageously determine whether the position of the handle differs from the position of the contacts. In particular, jammed contacts (contacts which do not open) can be identified, for example, corresponding information can be determined and appropriate measures can be carried out, for example the electronic interruption unit coming to have a high impedance or (/and) communication of the state, for example to another circuit breaker device or superordinate monitoring or management system.

In one advantageous configuration of the invention, the switching state (high impedance, low impedance) of the electronic interruption unit depends on the determined position of the contacts.

In one advantageous configuration of the invention, closing of the contacts (captured by the position sensor), in particular after closing of the contacts, initiates/starts the checking functions (by means of the control unit) and initiates/starts switching on of the electronic interruption unit in the event of a fault-free test.

This has the particular advantage that, owing to this novel (operating) concept, no further switch is necessary for the electronic interruption unit on the circuit breaker device.

In one advantageous configuration of the invention, the mechanical isolating contact unit is configured in such a manner that the contacts can be opened, but not closed, by the control unit.

This has the particular advantage that increased operational safety is achieved since the contacts cannot be inadvertently closed by the control unit.

In one advantageous configuration of the invention, the mechanical isolating contact unit is configured in such a manner that it is possible to close the contacts by means of the handle only when an enable signal is present.

This has the particular advantage that increased operational safety is achieved in the circuit or the circuit breaker device since only a functional circuit breaker device enables (manual) closing of the contact.

In one advantageous configuration of the invention, the electronic interruption unit is a single-pole electronic interruption unit which is provided, in particular, in the phase conductor current path.

This has the particular advantage that the single-pole nature reduces the complexity and at the same time, when arranged in the phase conductor current path, enables monitoring for overcurrents, short-circuit currents and ground fault currents in the low-voltage circuit.

In one advantageous configuration of the invention, a first voltage sensor unit is provided for the purpose of determining the level of the voltage across the connections of the electronic interruption unit of a current path.

This has the particular advantage that the determination of the level of the voltage across the electronic interruption unit can be used to advantageously easily support the determination of the functionality, in particular switching ability, of the electronic interruption unit. This achieves increased operational safety of a circuit breaker device since a faulty electronic interruption unit can be easily determined and can possibly interrupt the circuit breaker device.

In one advantageous configuration of the invention, a second voltage sensor unit is provided for the purpose of determining the level of the voltage at the network-side connections, in particular between the network-side neutral conductor connection and the network-side phase conductor connection.

This has the particular advantage that the voltage of the network-side connection can be monitored and the circuit can be disconnected, if necessary, in the event of overvoltages or undervoltages. The architecture according to the invention therefore supports increased operational safety of the circuit breaker device or in the circuit.

In one advantageous configuration of the invention, a display unit connected to the control unit is provided.

This has the particular advantage that it is possible to display status information relating to the circuit breaker device.

In one advantageous configuration of the invention, a communication unit connected to the control unit is provided.

This has the particular advantage that it is possible to communicate status information to other circuit breaker devices or to a superordinate management system.

In one advantageous configuration of the invention, a temperature sensor unit is provided, in particular for the purpose of determining the temperature of the electronic interruption unit.

The temperature sensor unit can be connected to the electronic interruption unit or/and the control unit.

This has the particular advantage that there is further protection against overheating and consequently blowing of the semiconductor-based switching elements of the electronic interruption unit. Furthermore, increased current-carrying capacity can be achieved.

The current path/phase conductor path can be interrupted if at least one temperature limit value is exceeded.

In one advantageous configuration of the invention, a differential current sensor connected to the control unit is provided.

This has the particular advantage that the circuit breaker device also has fault current monitoring (differential current monitoring) and therefore has a further functionality.

In one advantageous configuration of the invention, the current sensor unit is provided on the current path side between the network-side phase conductor connection and the load-side phase conductor connection.

This has the particular advantage that it is possible to monitor for overcurrents, short-circuit currents and ground fault currents in the low-voltage circuit by virtue of the arrangement in the phase conductor current path.

In one advantageous configuration of the invention, the low-voltage circuit is a three-phase AC circuit and the circuit breaker device has further network-side and load-side phase conductor connections, between each of which there is provided a series circuit of an electronic interruption unit and a contact of the mechanical isolating contact unit. Further units, such as current sensor units, first or/and second voltage sensor units, may be provided in a similar manner.

This has the particular advantage that there is a solution for three-phase AC circuits.

In one advantageous configuration of the invention:
when the contacts of the mechanical isolating contact unit are closed and the interruption unit has a low impedance and
when a current that exceeds a first current value is determined, in particular the first current value is exceeded for a first time limit, the electronic interruption unit comes to have a high impedance and the mechanical isolating contact unit remains closed,
when a current that exceeds a second current value for a second time limit is determined, the electronic interruption unit comes to have a high impedance and the mechanical isolating contact unit is opened,
when a current that exceeds a third current value is determined, the electronic interruption unit comes to have a high impedance and the mechanical isolating contact unit is opened.

This has the particular advantage that there is a graduated switch-off concept for the circuit breaker device according to the invention.

In one advantageous configuration of the invention, the control unit has a microcontroller.

This has the particular advantage that the functions according to the invention for increasing the safety of a circuit breaker device or of the electrical low-voltage circuit to be protected can be implemented by means of an (adaptable) computer program product. Furthermore, changes and improvements in the function can be individually loaded onto a circuit breaker device as a result.

All configurations, both in dependent form referring back to the independent circuit breaker patent claim, and referring back only to individual features or combinations of features of patent claims, improve a circuit breaker device, in particular a new architecture, and improve the safety of a circuit breaker device or the electrical circuit, and provide a new concept for a circuit breaker device.

The described properties, features and advantages of this invention and the manner in which they are achieved become clearer and more distinctly comprehensible in connection with the following description of the exemplary embodiments which are explained in more detail in connection with the drawing.

DETAILED DESCRIPTION OF THE INVENTION

Figure 1:
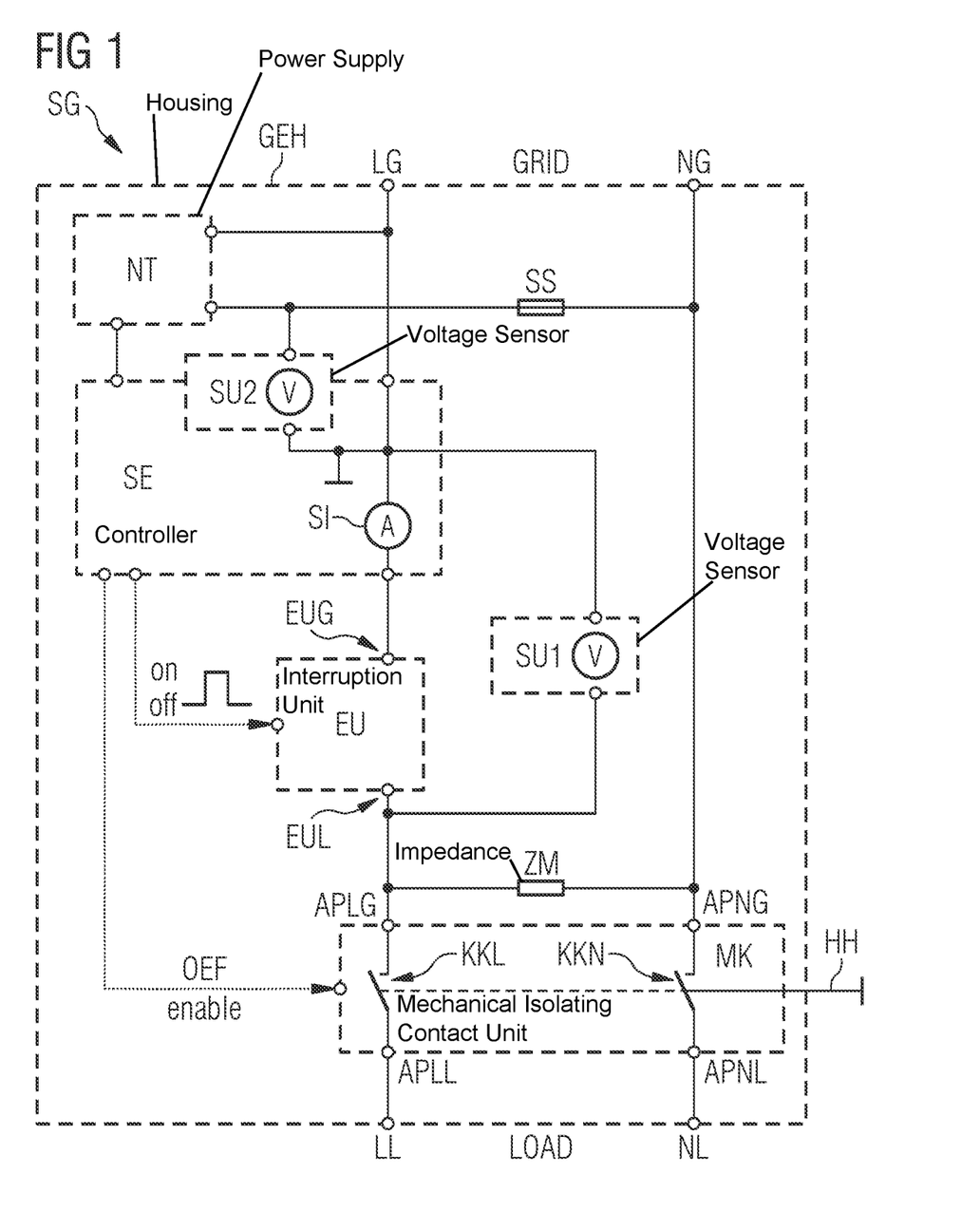
FIG. 1 shows a first basic illustration of a circuit breaker device.

FIG. 1 shows an illustration of a circuit breaker device SG for protecting an electrical low-voltage circuit, in particular a low-voltage AC circuit, having a housing GEH, having:

network-side connections which comprise, in the example, a network-side neutral conductor connection NG and a network-side phase conductor connection LG,
load-side connections which comprise, in the example, a load-side neutral conductor connection NL and a load-side phase conductor connection LL,
the connections are provided for the low-voltage circuit;
an energy source is usually connected to the network-side connections/the network side GRID,
a consumer is usually connected to the load-side connections/the load side LOAD;
a (two-pole) mechanical isolating contact unit MK having load-side connection points APLL, APNL and network-side connection points APLG, APNG,
wherein a load-side connection point APNL is provided for the neutral conductor, a load-side connection point APLL is provided for the phase conductor, a network-side connection point APNG is provided for the neutral conductor, and a network-side connection point APLG is provided for the phase conductor. The load-side connection points APNL, APLL are connected to the load-side neutral and phase conductor 7 connections NL, LL, with the result that opening of contacts 8 KKN, KKL in order to avoid a current flow or closing of the contacts for a current flow in the low-voltage circuit can be switched,
an in particular single-pole electronic interruption unit EU (which is arranged, in particular, in the phase conductor in the case of a single-pole design),
having a network-side connecting point EUG which is electrically connected to the network-side phase conductor connection LG, and
a load-side connecting point EUL which is electrically connected to the network-side connection point APLG of the mechanical isolating contact unit MK, wherein the electronic interruption unit EU has, by virtue of semiconductor-based switching elements (not illustrated), a high-impedance state of the switching elements in order to avoid a current flow or a low-impedance state of the switching elements for the current flow in the low-voltage circuit, or can be switched,
a current sensor unit SI for determining the level of the current of the low-voltage circuit, which current sensor unit is arranged, in particular, in the current path of the phase conductor or phase conductor current path,
a control unit SE which is connected to the current sensor unit SI, the mechanical isolating contact unit MK and the electronic interruption unit EU, wherein avoidance of a current flow in the low-voltage circuit is initiated if current limit values or/and current-time limit values are exceeded.

According to the invention, the mechanical isolating contact unit MK is arranged on the load side, and the electronic interruption unit EU is arranged, according to the invention, on the network side.

The network side GRID having the energy source is normally live. An electrical consumer is usually connected to the load side LOAD.

The mechanical isolating contact unit MK has a position sensor for determining position information relating to the closed or open state of the at least one contact or the contacts KKN, KKL of the mechanical isolating contact unit MK. Information relating to the switching state of the mechanical isolating contact unit MK is therefore available, in particular, for the control unit SE, with the result that there is information relating to whether a connected consumer is possibly supplied with energy, since the novel circuit breaker device is advantageously almost continuously supplied with energy.

The circuit breaker device can be configured in such a manner that the level of the voltage across the electronic interruption unit can advantageously be determined. That is to say, the level of a first voltage between the network-side connecting point EUG and the load-side connecting point EUL of the electronic interruption unit EU can be determined or is determined.

For this purpose, a first voltage sensor unit SU1 connected to the control unit SE is provided in the example according to FIG. 1 and determines the level of the voltage between the network-side connecting point EUG and the load-side connecting point EUL of the electronic interruption unit EU.

During the voltage measurement by the first voltage sensor unit SU1, the voltage across the series circuit of the electronic interruption unit EU and the current sensor SI can alternatively also be determined, as illustrated in FIG. 1.

The current sensor unit SI has a very low internal resistance, with the result that the determination of the level of the voltage is not impaired or is negligibly impaired.

A second voltage sensor unit SU2 which determines the level of the voltage between the network-side neutral conductor connection NG and the network-side phase conductor connection LG can be advantageously provided.

The first voltage sensor unit can also be replaced by using two voltage measurements (upstream of the electronic interruption unit and downstream of the electronic interruption unit). The voltage across the electronic interruption unit is determined by forming a difference.

A/the second voltage sensor unit SU2 connected to the control unit SE may be provided and determines the level of a second voltage between the network-side neutral conductor connection NG and the network-side phase conductor connection LG. Furthermore, a third voltage sensor unit SU3 (not illustrated) connected to the control unit may be provided and determines the level of a third voltage between the network-side neutral conductor connection NG and the load-side connecting point EUL of the electronic interruption unit EU. The circuit breaker device is configured in such a manner that the level of a/the first voltage between the network-side connecting point EUG and the load-side connecting point EUL of the electronic interruption unit EU is determined from the difference between the second and third voltages.

A measurement impedance ZM may be connected between the network-side connection points APLG, APNG of the mechanical isolating contact unit MK. The measurement impedance ZM May be an electrical resistor or/and a capacitor, for example. The measurement impedance may also be an inductor. In particular, the measurement impedance may be a series circuit or parallel circuit of a resistor or/and a capacitor or/and an inductor.

In the example according to FIG. 1, the electronic interruption unit EU has a single-pole design, in the phase 8 conductor in the example. In this case, the network-side connection point APNG for the neutral conductor of the mechanical isolating contact unit MK is connected to the network-side neutral conductor connection NG of the housing GEH.

The circuit breaker device SG is advantageously configured in such a manner that the contacts of the mechanical isolating contact unit MK can be opened, but not closed, by the control unit SE, which is indicated by an arrow from the control unit SE to the mechanical isolating contact unit MK.

The mechanical isolating contact unit MK can be operated by means of a mechanical handle HH on the circuit breaker device SG in order to switch manual opening or closing of the 21 contacts KKL, KKN. The mechanical handle HH can indicate the switching state (open or closed) of the contacts of the mechanical isolating contact unit MK on the circuit breaker device. However, the situation of the handle may also differ from the switching state of the contacts, for example if a so-called trip-free mechanism is used or if the contacts are jammed.

In this case, for example, the handle may advantageously have an actuation sensor which is connected to the control unit, for determining actuation information relating to the handle. A difference between the situation of the handle and the switching position of the contacts can therefore be determined. Measures for this case may be implemented. For example, sticky contacts, which are a problem for protecting the low-voltage circuit, may therefore be identified. As measures, the electronic interruption unit may come to have a high impedance, a message may be displayed, a message may be emitted, for example to another circuit breaker device or/and monitoring or management system.

The mechanical isolating contact unit MK is advantageously configured in such a manner that (manual) closing of the contacts by means of the mechanical handle is possible only after an enable (enable), in particular an enable signal. This is likewise indicated by the arrow from the control unit SE to the mechanical isolating contact unit MK. That is to say, the contacts KKL, KKN of the mechanical isolating contact unit MK may be closed (by the control unit) by means of the handle HH only when the enable or the enable signal is present. Although the handle HH can be actuated without the enable or the enable signal, the contacts cannot be closed ("permanent slider contacts").

The circuit breaker device SG has an energy supply or power supply unit NT, for example a switched-mode power supply unit. In particular, the energy supply/power supply unit NT is provided for the control unit SE, which is indicated by a link between the energy supply/power supply unit NT and the control unit SE in FIG. 1. The energy supply/power supply unit NT is connected (on the other hand) to the network-side neutral conductor connection NG and the network-side phase conductor connection LG. A fuse SS, in particular a safety fuse, or a switch SCH (FIG. 2) may be advantageously provided in the link to the network-side neutral conductor connection NG (or/and phase conductor connection LG).

The power supply unit NT is normally constantly supplied with energy according to the invention. It is possibly protected by the fuse SS or can be switched off by means of the switch SCH.

Alternatively, the measurement impedance ZM may be connected to the network-side neutral conductor connection NG via this link to the fuse SS.

This advantageously makes it possible to implement a three-pole electronic unit EPART (FIG. 2), for example in the form of a module, which has three connection points for the low-voltage circuit, one neutral conductor connection point and two phase conductor connection points. The electronic unit EPART has, for example, the electronic interruption unit EU, the control unit SE, the energy supply NT (in particular including the fuse SS), the current sensor unit SI, optionally the first voltage sensor unit SU1 or/and optionally the second voltage sensor unit SU2.

The low-voltage circuit may be a three-phase AC circuit having one neutral conductor and three phase conductors. For this purpose, the circuit breaker device may be configured as a three-phase variant and may have, for example, further network-side and load-side phase conductor connections. In a similar manner, electronic interruption units according to the invention and contacts of the mechanical isolating contact unit as well as current sensor units are respectively provided between the further network-side and load-side phase conductor connections. Voltage determinations (for example by means of first voltage sensor units) may also be provided.

High impedance is used to mean a state in which only a current of a negligible magnitude flows. In particular, a current of a negligible magnitude is less than 2 mA, more specifically less than 0.5 mA. In particular, high impedance is used to mean resistance values of greater than 1 kilohm, preferably greater than 10 kilohms, 100 kilohms, 1 megaohm, 10 megaohms, 100 megaohms, 1 gigaohm or greater.

Low impedance is used to mean a state in which the current value indicated on the circuit breaker device could flow. In particular, low impedance is used to mean resistance values of less than 10 ohms, preferably less than 1 ohm, 100 milliohms, 10 milliohms, 1 milliohm or less.

Figure 2:
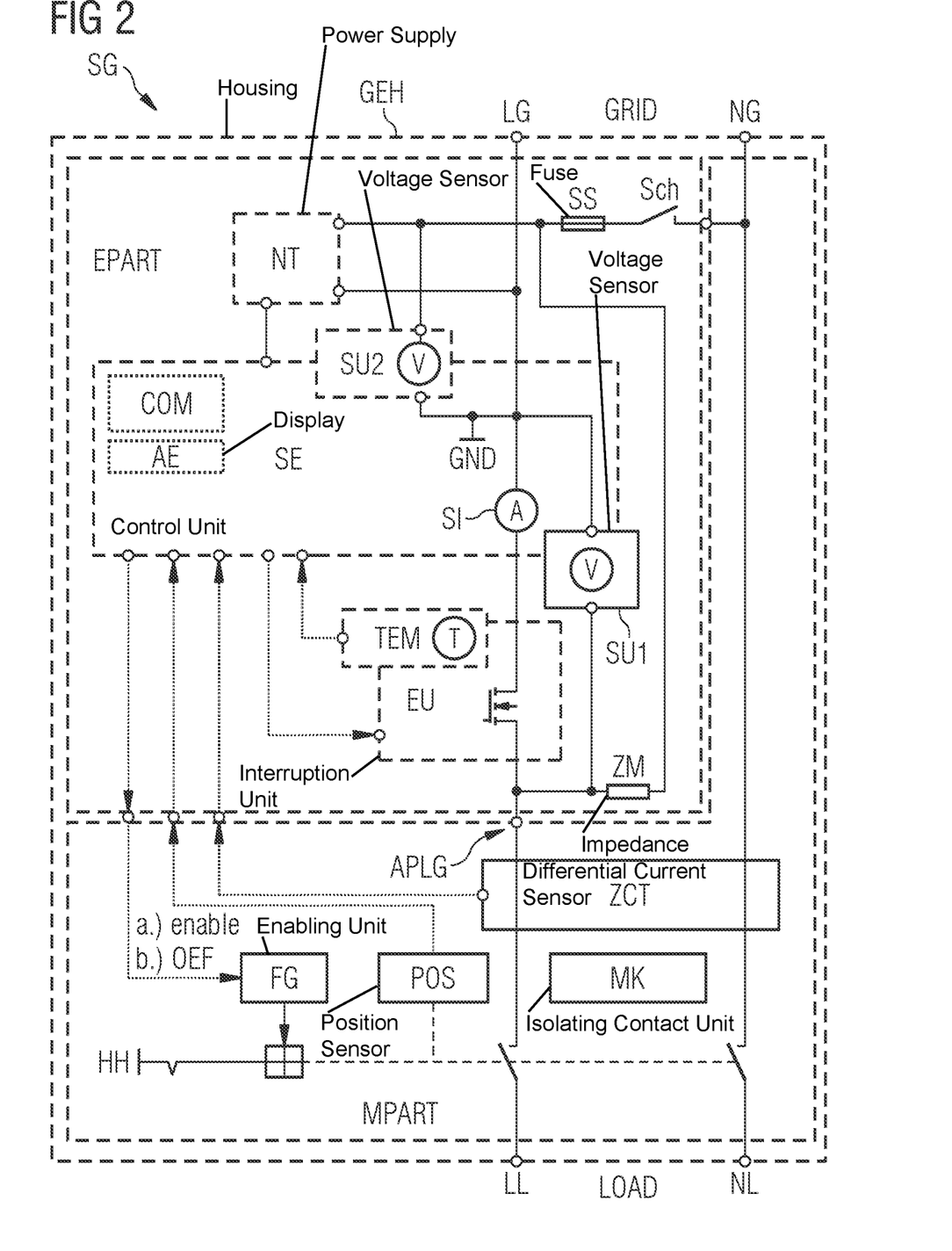
FIG. 2 shows a second basic illustration of a circuit breaker device.

FIG. 2 shows a representation according to FIG. 1, with the difference that the circuit breaker device has a two-part design. It contains an electronic first part EPART, for example on a printed circuit board.

The first part EPART may have the control unit SE, the first voltage sensor unit SU1, the second voltage sensor unit SU2, the current sensor unit SI, the electronic interruption unit EU and the energy supply NT. The first part may also have the safety fuse SS, a switch SCH, the measurement impedance ZM, a temperature sensor TEM (in particular for the electronic interruption unit EU), a communication unit COM, and a display unit AE.

The First Part EPART has Only Three Connections:
the network-side phase conductor connection LG,
a connection for or to the network-side phase conductor connection point APLG of the mechanical isolating contact unit MK, 19
a connection for a link to the network-side neutral conductor connection NG.

The communication unit COM can be a wireless communication unit, in particular.

The circuit breaker device contains a second part MPART, in particular a mechanical second part. The second part MPART may have the mechanical isolating contact unit MK with the position sensor (position unit) POS according to the invention for reporting the position of the contacts of the mechanical isolating contact unit MK to the control unit, the handle HH and an enabling unit FG. The second part may also have the (neutral conductor) link(s).

A differential current sensor ZCT, such as a summation current transformer, as is known, for example, from conventional fault-current circuit breakers, may also be provided.

Further units which are not described in any more detail May be provided.

A compact circuit breaker device according to the invention can be advantageously implemented by virtue of the two-part design.

The enabling unit/enabling function FG enables the actuation of the contacts of the mechanical isolating contact unit by means of the handle HH if there is an enable signal enable. That is to say, it is possible to close the contacts KKL, KKN (by the control unit SE) by means of the handle only when the enable signal enable is present. Otherwise, closing is not possible (permanent sliding of the handle HH). The contacts remain in the open situation/switching state.

Furthermore, the enabling unit FG may open the contacts (second function of the enabling unit FG) if there is an opening signal OEF (from the control unit SE). The enabling unit/enabling function FG then acts as a tripping unit for opening the contacts of the mechanical isolating contact unit MK.

The current path via the mechanical isolating contact unit MK connected in series and the single-pole electronic interruption unit EU forms, when arranged in the phase conductor according to FIG. 1, a phase conductor path, that is to say a path for the phase conductor through the circuit breaker device SG (inside the housing). The neutral conductor is routed only via the mechanical isolating contact unit MK and is then a neutral conductor path, that is to say a path for the neutral conductor through the circuit breaker device SG (inside the housing).

It is also possible to provide a single-pole design of the circuit breaker device with only one mechanical contact, preferably in the phase conductor. The circuit breaker device then has, for example:
(only) one load-side (phase conductor) connection LL
a network-side phase conductor connection LG and a network-side neutral conductor connection NG.

The load-side neutral conductor connection is not provided 11 in this case.

The position information can be advantageously used to carry out functional checks of the circuit breaker device. In particular, different checking functions can be carried out on the basis of the position information.

The following situation is considered, by way of example, below:
nominal voltage or network voltage (for example 230 V AC) is applied to the network-side connection LG, NG or network side GRID or network connection of the circuit breaker device,
a consumer or energy sink or load is connected to the load side LOAD of the circuit breaker device.

In the first step, the check in the OFF state of the electronic protection device is intended to be considered. For this Purpose:
the mechanical isolating contact unit is open (contacts open)-determination via the position sensor
the electronic interruption unit is switched off (semiconductor-based switching elements have a high impedance)
the control unit (including the controller unit) is active.

The electrical potential between the electronic interruption unit and the mechanical isolating contact unit is defined by the measurement impedance ZM and the impedance of the electronic interruption unit in the switched-off state (voltage divider).

The control unit can now switch on the semiconductor-based switching elements at any time (and therefore for a specific voltage division (depending on the instantaneous value of the voltage, the half-wave of the voltage)). The switching elements of the electronic interruption unit EU can hereby be tested by taking into account the polarity of the AC voltage.

The electronic interruption unit EU (or the electronic switch) is therefore switched on for a very short time (in the milliseconds range), for example. The measurement time is limited by the open contacts. If these are closed, this check is ended. This state is determined according to the invention by the position sensor POS.

If the electronic interruption unit is functional, this can be determined by means of the (simultaneous) voltage measurement (for example first voltage sensor unit, second voltage sensor unit) and (subsequent) evaluation. For example, it is possible to determine, in the case of a defective semiconductor-based switching element, whether it always remains switched on (fault pattern: "broken down") or always remains switched off (fault pattern: "blown").

Two typical and common fault patterns are therefore covered.

If the check is fault-free, an enable to switch on the circuit breaker device, specifically the electronic interruption unit or the mechanical isolating contact unit, can be effected.

If the check is not fault-free, no enable to switch on the circuit breaker device will be effected, with the result that the outgoing circuit cannot be switched on and a dangerous state is therefore prevented.

The circuit breaker device is configured in such a manner that, when the contacts of the mechanical isolating contact unit MK are open and the electronic interruption unit EU has been switched to high impedance, the level of the voltage across the electronic interruption unit, that is to say the first voltage U1, is determined. There is a first fault condition if a first voltage threshold value is undershot, with the result that the electronic interruption unit is prevented from coming to have a low impedance or/and closing of the contacts is prevented. With regard to the mechanical isolating contact unit MK, an enable signal enable is not emitted from the control unit SE to the mechanical isolating contact unit MK, for example.

The circuit breaker device is advantageously configured in such a manner that closing of the contacts of the mechanical isolating contact unit MK is prevented when there is a fault condition. In particular, no enable signal (enable) is emitted to the mechanical isolating contact unit MK.

Another functional check may be that the contacts of the mechanical isolating contact unit are closed and the electronic interruption unit has a low impedance. The closed contact state is again determined using the position sensor.

The circuit breaker device is configured in such a manner that, when the contacts of the mechanical isolating contact unit MK are closed and the electronic interruption unit EU has been switched to low impedance, the level of the voltage across the electronic interruption unit is determined. If a fifth voltage threshold value is exceeded, there is a fourth fault condition which initiates the electronic interruption unit coming to have a high impedance or/and initiates opening of the contacts.

Furthermore, the circuit breaker device is configured in such a manner that, when the contacts of the mechanical isolating contact unit MK are closed and the electronic interruption unit EU has been switched to low impedance, the electronic 11 interruption unit EU is switched to a high-impedance state for a third period of time and the level of the voltage across the electronic interruption unit is determined. If a sixth voltage threshold value is undershot, there is a fifth fault condition which initiates the electronic interruption unit coming to have a high impedance or/and initiates opening of the contacts.

If the fifth or sixth fault condition is present, an opening signal OEF is sent from the control unit SE to the mechanical isolating contact unit MK in order to initiate opening of the contacts. The control unit SE may also send a signal (not depicted) for coming to have a high impedance to the electronic interruption unit. The mechanical contacts are preferably opened shortly before the current zero crossing, with the result that the mechanical switching contacts can interrupt the current flow more easily.

The electronic interruption unit is advantageously switched to a high-impedance state when the instantaneous value of the voltage between the network-side neutral conductor connection and the network-side phase conductor connection exceeds a seventh voltage threshold value, in particular when the instantaneous value of the voltage is at a maximum.

A further functional check may be that the contacts of the mechanical isolating contact unit are closed and the electronic interruption unit has a high impedance. The closed contact state is again determined using the position sensor.

The circuit breaker device is configured in such a manner that, when the contacts of the mechanical isolating contact unit MK are closed and the electronic interruption unit EU has been switched to high impedance, the electronic interruption unit EU is switched to a low-impedance state for a second period of time and the level of the voltage across the electronic interruption unit is then determined. If a third voltage threshold value is exceeded, there is a third fault condition which prevents the electronic interruption unit from being switched to low impedance or/and initiates opening of the contacts.

If the third fault condition is present, an opening signal OEF is sent from the control unit SE to the mechanical isolating contact unit MK in order to initiate opening of the contacts. The mechanical contacts are preferably opened shortly before the current zero crossing, with the result that the mechanical switching contacts can interrupt the current flow more easily. Furthermore, the control unit SE can prevent or suppress 23 a signal for the electronic interruption unit coming to have a low impedance.

The electronic interruption unit is advantageously switched to a low-impedance state when the instantaneous value of the voltage between the network-side neutral conductor connection and the network-side phase conductor connection undershoots a fourth voltage threshold value.

The switching-on time is advantageously selected, in the case of small voltage values (less than the fourth voltage threshold value), in order to minimize the resulting measurement current through the consumer/the energy sink/the load, and also to ensure personal protection. The fourth voltage threshold value may be, for example, (a maximum of) 50 V AC. That is to say, only safe (protective) extra-low voltages are used during switch-on.

A further functional check may be that the mechanical isolating contact unit is closed and the electronic interruption unit has a high impedance. Depending on the applied voltage polarity, the functionality of the switching elements can be checked in a similar manner by briefly switching on the electronic interruption unit or its semiconductor-based switching elements.

The closed contact state is again determined using the position sensor. The respective functional check can be ended during an opening operation.

The measurement impedance ZM should have a very high value (resistance or impedance value) in order to keep the losses low, for example a value of 1 MOhm, for example, in the case of a resistance. A value of 1 MOhm leads to losses of approximately 50 mW in a 230 V low-voltage circuit.

The measurement impedance should advantageously be greater than 100 kOhm, 500 kOhm, 1 MOhm, 2 MOhm, 3 MOhm, 1 MOhm, 5 MOhm or more.

Although the invention has been described and illustrated more specifically in detail by means of the exemplary embodiment, the invention is not restricted by the disclosed examples and other variations can be derived therefrom by a person skilled in the art without departing from the scope of protection of the invention.

The invention claimed is:

1. A circuit breaker device for protecting an electrical low-voltage alternating current (AC) circuit, the circuit breaker device comprising:
  a housing with network-side connections and load-side connections for the electrical low-voltage AC circuit;
  an electronic interruption unit;
  a mechanical isolating contact unit having contacts and connected in series with said electronic interruption unit, wherein said mechanical isolating contact unit is assigned to said load-side connections and said electronic interruption unit is assigned to said network-side connections, said mechanical isolating contact unit being switched by means of opening of at least one of said contacts in order to avoid a current flow or closing of said at least one contact for the current flow in the electrical low-voltage AC circuit;
  said electronic interruption unit having semiconductor-based switching elements and being switched, by means of said semiconductor-based switching elements, to a high-impedance state of said semiconductor-based switching elements in order to avoid the current flow or a low-impedance state of said semiconductor switching elements for the current flow in the electrical low-voltage AC circuit;
  a current sensor for determining a level of a current of the electrical low-voltage AC circuit;
  a controller connected to said current sensor, said mechanical isolating contact unit and said electronic interruption unit, wherein avoidance of the current flow in the electrical low-voltage AC circuit is initiated if current limit values or/and current-time limit values are exceeded;
  said mechanical isolating contact unit having a position sensor for determining position information relating to a closed or open state of said at least one contact;
  said mechanical isolating contact unit further having a handle for manually opening and closing said at least one contact; and
  said mechanical isolating contact unit configured such that said at least one contact can be opened, but not closed, by said controller.

2. The circuit breaker device according to claim 1, wherein said position sensor is connected to said controller, with a result that said controller has the position information relating to the closed or open state of said at least one contact.

3. The circuit breaker device according to claim 1, wherein the circuit breaker device is configured such that the position information from said position sensor is processed in the circuit breaker device.

4. The circuit breaker device according to claim 1, wherein the circuit breaker device is configured such that the position information is used to carry out functional checks of the circuit breaker device.

5. The circuit breaker device according to claim 4, wherein the circuit breaker device is configured such that, for a functional check of the circuit breaker device when said at least one contact of said mechanical isolating contact unit is open and said electronic interruption unit has been switched to the high-impedance state, a level of a voltage across said electronic interruption unit is determined, in that there is a first fault condition if a first voltage threshold value is undershot, with a result that said electronic interruption unit is prevented from coming to have the low-impedance state and/or closing of said at least one contact is prevented.

6. The circuit breaker device according to claim 5, wherein the closing of said at least one contact of said mechanical isolating contact unit is prevented when there is a fault condition.

7. The circuit breaker device according to claim 4, wherein the circuit breaker device is configured such that, for a functional check of the circuit breaker device when said at least one contact of said mechanical isolating contact unit is open and said electronic interruption unit has been switched to the high-impedance state, said electronic interruption unit is switched to the low-impedance state for a first period of time and a level of a voltage across said electronic interruption unit is determined, and in that there is a second fault condition if a second voltage threshold value is exceeded, with a result that said electronic interruption unit is prevented from further coming to have the low-impedance state or/and a closing of said at least one contact is prevented.

8. The circuit breaker device according to claim 4, wherein the circuit breaker device is configured such that, for a functional check of the circuit breaker device when said at least one contact of said mechanical isolating contact unit is closed and said electronic interruption unit has been switched to the high-impedance state, said electronic interruption unit is switched to the low-impedance state for a second period of time and a level of a voltage across said electronic interruption unit is determined, and in that, if a third voltage threshold value is exceeded, there is a third fault condition which prevents said electronic interruption unit from being switched to the low-impedance state or/and initiates opening of said at least one contact.

9. The circuit breaker device according to claim 8,
  further comprising a network-side neutral conductor connection and a network-side phase conductor connection; and
  wherein said electronic interruption unit is switched to the low-impedance state when an instantaneous value of a voltage between said network-side neutral conductor connection and said network-side phase conductor connection undershoots a fourth voltage threshold value.

10. The circuit breaker device according to claim 4, wherein the circuit breaker device is configured such that, for a functional check of the circuit breaker device when said at least one contact of said mechanical isolating contact unit is closed and said electronic interruption unit has been switched to the low-impedance state, a level of a voltage across said electronic interruption unit is determined, and in that, if a fifth voltage threshold value is exceeded, there is a fourth fault condition which initiates said electronic interruption unit coming to have the high-impedance state or/and initiates opening of said at least one contact.

11. The circuit breaker device according to claim 4, wherein the circuit breaker device is configured such that, for a functional check of the circuit breaker device when said at least one contact of said mechanical isolating contact unit is closed and said electronic interruption unit has been switched to the low-impedance state, said electronic interruption unit is switched to the high-impedance state for a third period of time and a level of a voltage across said electronic interruption unit is determined, and in that, if a sixth voltage threshold value is undershot, there is a fifth fault condition which initiates said electronic interruption unit coming to have the high-impedance state and/or initiates opening of said at least one contact.

12. The circuit breaker device according to claim 11,
further comprising a network-side neutral conductor connection and a network-side phase conductor connection; and
wherein said electronic interruption unit is switched to the high-impedance state when an instantaneous value of the voltage between said network-side neutral conductor connection and said network-side phase conductor connection exceeds a seventh voltage threshold value.

13. The circuit breaker device according to claim 1, wherein said mechanical isolating contact unit is configured such that the position information relating to the closed or open state of said at least one contact can differ from a situation of said handle.

14. The circuit breaker device according to claim 1, wherein said handle has an actuation sensor which is connected to said controller, for determining actuation information relating to said handle.

15. The circuit breaker device according to claim 1, wherein:
said mechanical isolating contact unit is configured such that it is possible to close said at least one contact by means of said handle only when an enable signal is present.

16. The circuit breaker device according to claim 1, wherein:
said electronic interruption unit is one of a plurality of electronic interruption units;
the electrical low-voltage AC circuit is a three-phase AC circuit; and
the circuit breaker device further has network-side and load-side phase conductor connections, between each of said network-side and said load-side phase conductor connections there is provided a series circuit of one of said electronic interruption units and one of said contacts of said mechanical isolating contact unit.

17. The circuit breaker device according to claim 1, wherein:
if said at least one contact of said mechanical isolating contact unit is closed and said electronic interruption unit has the low-impedance state; and
if the current that exceeds a first current value is determined, said electronic interruption unit comes to have the high-impedance state and said mechanical isolating contact unit remains closed;
if the current that exceeds a second current value for a second time limit is determined, said electronic interruption unit comes to have the high-impedance state and said mechanical isolating contact unit is opened; and
if the current that exceeds a third current value is determined, said electronic interruption unit comes to have the high-impedance state and said mechanical isolating contact unit is opened.

18. The circuit breaker device according to claim 1, wherein said controller has a microcontroller.

19. The circuit breaker device according to claim 1, wherein the circuit breaker device is configured such that the checking functions are started after a closing of said contacts, which is captured by said position sensor, and said electronic interruption unit is switched on in an event of a fault-free test.

20. A position sensor system, comprising:
a position sensor configured for the mechanical isolating contact unit of the circuit breaker device according to claim 1.

* * * * *